United States Patent [19]
Smith et al.

[11] 3,808,074
[45] Apr. 30, 1974

[54] INDUCTION HEAT SEALING OF A CONTAINER

[75] Inventors: John Graham Smith, London Colney; Allen William Sporle, Luton, both of England

[73] Assignee: United Glass Limited, Staines, Middlesex, England

[22] Filed: Apr. 13, 1972

[21] Appl. No.: 243,664

[52] U.S. Cl.............. 156/69, 156/272, 156/380, 219/10.43
[51] Int. Cl....... B65b 7/28, B29c 27/04, H05b 5/00
[58] Field of Search....... 156/69, 272, 380; 219/8.5, 219/10.43

[56] References Cited
UNITED STATES PATENTS

| | | | |
|---|---|---|---|
| 3,604,880 | 9/1971 | O'Neill | 156/69 |
| 2,426,053 | 8/1947 | Robends | 219/10.43 |
| 3,397,295 | 8/1968 | Hale | 219/8.5 |
| 3,462,336 | 8/1969 | Leatherman | 156/380 |
| 2,920,173 | 1/1960 | Wastberg | 156/380 |
| 3,706,176 | 12/1972 | Leatherman | 156/69 |
| 3,723,212 | 3/1973 | Casper | 156/380 |

*Primary Examiner*—Douglas J. Drummond
*Attorney, Agent, or Firm*—Cushman, Darby & Cushman

[57] ABSTRACT

A method of induction heat sealing a sealing membrane to a container, wherein at least one of the container and the membrane is of a metallic material and the sealing is brought about through the intermediary of a thermoplastic material, comprising pressing the membrane onto the mouth of the container and rapidly raising, by means of an induced radio frequency current, the temperature of the metallic component to cause the thermoplastic material to soften or melt and thus bring about adhesion or bonding between the membrane and the mouth of the container, wherein the magnetic flux density is increased in the region of desired parts of the metallic component by means of flux density intensifiers.

14 Claims, 17 Drawing Figures

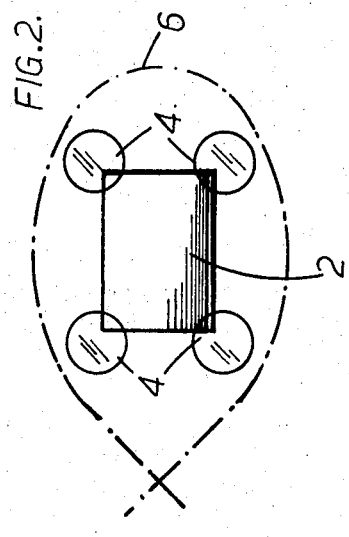
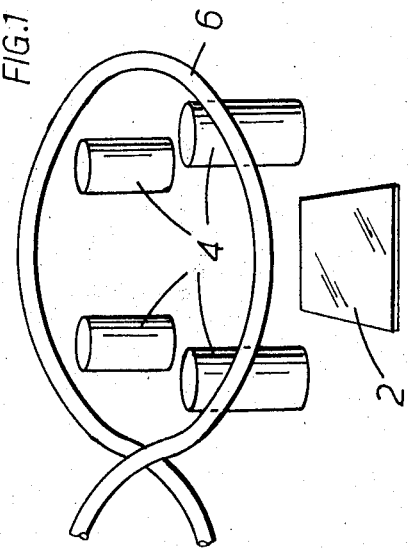
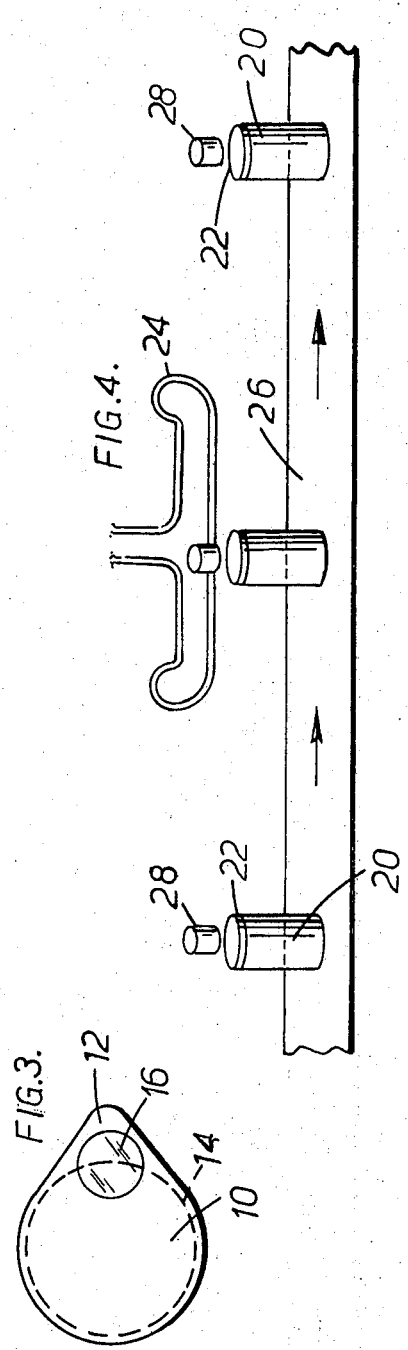
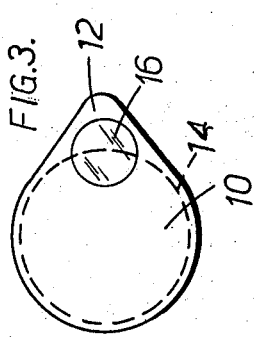

INDUCTION HEAT SEALING OF A CONTAINER

This invention relates to the sealing of containers, and is especially concerned with a process wherein containers are sealed with a sealing membrane by means of the application of an induced radio frequency current.

It is known to seal containers by induction heat sealing. In a typical process a sealing membrane, which may consist of aluminum foil coated on the underside with a thermoplastic material, is pressed onto the mouth of a container, e.g. a glass jar. The assembly is then subjected to the action of the magnetic field produced by a radio frequency induction coil, and the eddy currents induced in the metal of the membrane cause the membrane to be heated up very quickly. This causes the thermoplastic material coated thereon to soften or melt and the membrane is accordingly adhered or bonded to the container. Similar methods may be used to seal a plastics container or a metal container with, for example, a metal foil membrane or a plastics membrane respectively. We have described processes for induction heat sealing of containers in our British Pat. Specification Nos. 1,135,943, 1,160,252 and 1,207,306.

Difficulty is sometimes experienced in the sealing of containers in which the membranes overhang the edges of the containers, are provided with tear tabs, or have a crimped or uncrimped overhang. Non-circular containers, such as rectangular or multi-sided containers, tend not to be sealed at their corners, and these difficulties are accentuated under dynamic sealing conditions. The problem with such containers is that the corners of the sealing surfaces may not become adequately heated by the magnetic field and thus, although the sides are effectively sealed, the corners are not.

A conventional induction coil, used for heating non-ferrous components, e.g. the aluminum in the membranes described in our above-mentioned specifications, consists of two or more turns of tubing of sufficient bore to carry adequate cooling water. The induced energy from such a coil heats up the periphery of the membrane. Provided the membrane is circular and has no overhang, a good seal can be obtained with a conventional work coil. A good seal is obtained when the heat is induced in the region of the membrane that corresponds to the sealing edge on the container. Since, under normal conditions, the heat is induced in the extreme edge of the membrane and the edge is in contact with the sealing surface, the heat is induced exactly where it is needed. Any tendency for the extreme edge of the membrane to scorch is minimised by the dissipation of heat that takes place between the edge of the membrane and the sealing edge of the container that are held in contact with each other during the sealing operation.

However, when the edge of the membrane overhangs the edge of the container, there is no means of dissipating the heat by contact with the cold surface, and the overhanging edge becomes scorched before an effective seal is obtained against the inner part of the membrane corresponding to th rim of the container. This effect applies to the membrane with a uniform overhang as well as to membranes with tear tabs.

TEAR TAB MEMBRANES

A tear tab membrane is shown diagrammatically in FIG. 7 of the accompanying drawings. The container to be sealed has a circular sealing surface (shown by dotted line) and the only portion of the membrane that overhanges the rim of the container is the tear tab.

Eddy currents from the work coil are induced along the edge of the membrane (shown by the shading effect) and it is seen that the tear tab tends to absorb all the radio frequency energy from the area of the sealing rim of the container adjacent the tab. In other words, the eddy currents miss the path ABC and no seal is obtained in this section, although a good seal is obtained over the path ADC since no overhang is present. If more radio frequency energy is put into the sealing membrane in an attempt to obtain a seal along ABC, the tear tab becomes overheated, scorching both the adhesive coated on it and also any printed design applied to it.

MEMBRANES WITH A UNIFORM OVERHANG

Such a membrane is shown diagrammatically in FIG. 8 of the accompanying drawings. When attempting to seal such a membrane to a container having a sealing surface as shown by the dotted line, eddy currents are induced in the edge of the membrane that projects beyond the sealing edge of the container and sufficient heat is not developed in the section of the membrane that corresponds with the rim of the container. Thus, a satisfactory seal is not obtained, and again, if the R.F. energy is increased so as to overcome this effect, the overhang of the membrane becomes scorched.

In all cases, any tendency for the overhang to scorch is accentuated by the lack of any physical contact between the overhang and the container that would normally help to dissipate the heat produced. Difficulty is also experienced in sealing certain non-circular, such as, for example, rectangular membranes, with or without overhang, because of the uneven distribution of eddy currents along their sealing edges. Nearly all square or rectangular containers with their corresponding membranes fall into this category. The eddy currents tend to concentrate more in the sides of the membranes than in the corners. If the R.F. energy is increased to overcome this effect, the sides of the membranes become scorched before the corners are properly sealed.

Thus the main disadvantages of a conventional work coil can be summarised as follows:

1. The eddy currents are induced in the edges of the membranes.
2. The eddy currents tend to cut the corners of rectangular or multi-sided containers.

These disadvantages can be overcome by focusing the energy onto that part of the membrane where it is required to make the seal. In the case of most membranes with overhang, as well as non-circular membranes, the focusing of energy cannot be achieved by means of the work coil alone. However, for certain membranes in the above classes, a conventional work coil can be designed to produce a good seal statically, that is to say with the work coil and the membrane remaining stationary with respect to each other during the sealing process so as not to disturb the symmetry of the focused energy. But, when the same design of coil is used for sealing the containers dynamically, the symmetry of the focusing effect is lost and a bad seal is obtained. (A seal is said to be made "dynamically" when the membrane on the container moves through or under the work coil during the sealing operation).

It is an object of the present invention to provide an improved induction heat sealing method, wherein the above-described difficulties are reduced or eliminated, and which is especially adapted for sealing tear tab membranes, membranes with overhang, and non-circular membranes.

According to the present invention a method of induction heat sealing a sealing membrane to a container, wherein at least one of the container and the membrane is of a metallic material and the sealing is brought about through the intermediary of a thermoplastic material, comprises pressing the membrane onto the mouth of the container and rapidly raising, by means of an induced radio frequency current, the temperature of the metallic component to cause the thermoplastic material to soften or melt and thus bring about adhesion or bonding between the membrane and the mouth of the container, wherein the magnetic flux density is increased in the region of desired parts of the metallic component by means of flux density intensifiers.

The purpose of the flux density intensifiers is primarily to focus or concentrate the energy or heating effect of the magnetic field in those portions of the metallic component of the container assembly which require to be heated. Thus, for example, when heat-sealing containers having rectangular sealing surfaces, the flux density intensifiers can be set up in such a way that the heating effect developed at the corners is the same as that developed along the sides of the containers. When heat-sealing containers with membranes having projecting tear tabs, the magnetic field may be concentrated away from the tar tab.

In order to preserve the correct focus of energy and not to disturb its symmetry under dynamic sealing conditions the movement of the flux density intensifier must by synchronised with the movement of the membrane on the container so that the intensifier is stationary with respect to the membrane. The heating effect thus obtained is exactly the same as the effect that would have been produced had the container in fact been stationary during the sealing operation.

Suitable flux density intensifiers are those materials which are commercially known as "ferrites." These are solid materials which are readily available in the form of slabs. Other suitable materials are those sold by Polypenco Limited under the trade name "Ferrotron." This material comprises pentacarbonyl iron and a high temperature plastics material. A formulation which is particularly suitable for use according to the present invention comprises, by volume, 80 percent pentacarbonyl iron and 20 percent insulation. These materials are available in rod-like form. They are nonbrittle, maleable and ductile, are easily machined, and can be placed in contact with the bare metal of an induction coil without arcing.

In one embodiment of the invention, using "ferric" intensifiers, one or more intensifiers is/are attached to a suitably positioned induction coil, the positioning of the intensifiers with respect to the coil and the sealing surface being dependent upon the effect which it is desired they should have. For example, if it is desired to seal a container having a rectangular sealing surface, then the intensifiers would normally be attached to the induction coil at positions corresponding to the corners of the sealing surface.

In another embodiment, containers to be sealed, and their associated sealing membranes, are passed through the magnetic field produced by an induction coil in the company of an intensifier. For example, a series of intensifiers may be mounted on a rotary table rotating beneath an induction coil. Containers to be sealed are placed on the rotary table beneath the intensifiers, and move through the field of the induction coil with an intensifier between each container and the coil.

Preferably the intensifiers are cooled, for example by means of a flow of cold water, since otherwise they may tend to become heated if the induction coil is constantly or intermittently operative.

The use of "ferrite" — type intensifiers is illustrated in the drawings.

In those drawings, which are diagrammatic, and in which only essential features are shown, for the purpose of clarity, FIG. 1 is a perspective view of an induction heating system for heating a rectangular sealing membrane;

FIG. 2 is a plan view of the system of FIG. 1;

FIG. 3 is a schematic plan view of a sealing membrane provided with a tear-tab, showing the position of an intensifier;

FIG. 4 shows a system for the dynamic sealing of containers with short-skirted sealing membranes.

Figure 5:
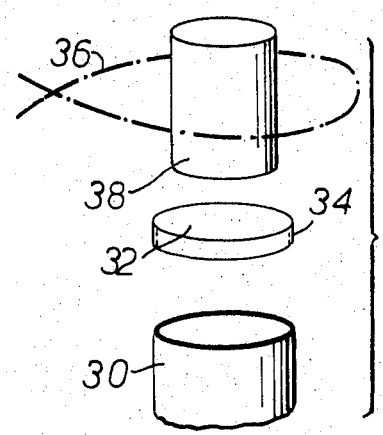
FIGS. 5, 6, 7 and 8 shows, respectively, systems for the static sealing of containers with short-skirted membranes and membranes with overhang, respectively.

Referring to FIGS. 1 and 2, an aluminium foil membrane 2, which is square in shape, is seated in sealing position on a container (not shown) having a square sealing surface. In order that the corners of the membrane should provide sufficient heat to soften a thermoplastic coating on the membrane (or the sealing surface of the container) four flux density intensifiers 4 are disposed relatively to the membrane and an induction coil 6 as shown. Radio frequency current is supplied to the coil 6. The intensifiers 4 are suitably cylindrical cores of ferrite or "Ferrotron."

FIG. 3 shows, in plan, a sealing membrane 10 provided with a tear-tab 12. In order to prevent the tear-tab absorbing a great deal of heat, and to ensure that the heat is concentrated along the sealing edge represented by the dotted line 14, a flux density intensifier 16 is positioned as shown, between the membrane 10 and an induction coil (not shown).

Referring now to FIG. 4, containers 20, to which short-skirted aluminium foil sealing membranes 22 are to be applied by induction heating, are moved towards an R.F. induction coil 24 on a conveyor belt 26. As they approach the coil 24 an intensifier 28 is brought into a position above and coaxially with each container, and maintains this position as the container/membrane assembly passes beneath the coil 24. The heat sealing effect is thereby similar to that produced if the container had not been moving, and there is no scorching of the membrane in the regions of the leading and trailing edges.

In FIG. 5, a container 30 is sealed with a coated aluminium foil membrane 32 having a short skirt portion 34. This is effected by means of an induction coil 36 and an intensifier 38 positioned axially above the membrane.

Figure 6:
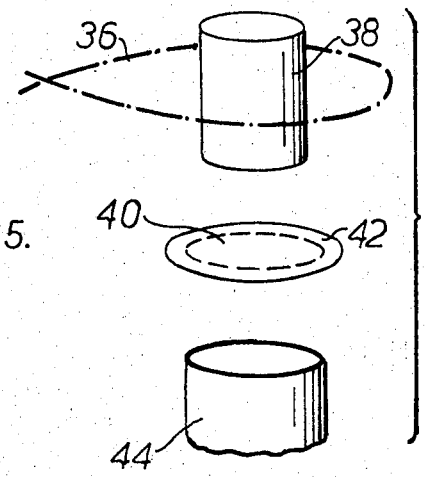
Figure 7:
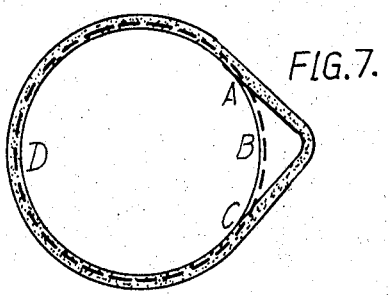
Figure 8:
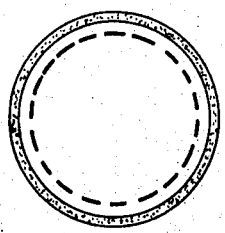

In FIG. 6, a sealing membrane 40 having an overhang portion 42 is adhered to a container 44 by means of a similar heating system to that shown in FIG. 5.

The intensifiers, e.g. of "Ferrotron," concentrate all the magnetic energy produced by the work coil into an area aproximately equal to the cross-sectional area of the intensifier. The magnetic energy thus leaves the bottom surface of the intensifier and is concentrated on the central region of the membrane, thus eliminating scorching of the skirt or overhang. Heat is conducted outwards to the sealing area (the rim of the container) and sealing is effected.

A second form of intensifier suitable for use in the invention, for directing and concentrating the energy in the pattern required, is a split metal plate or ring. The plate or ring may consist of any metal of high conductivity, such as copper or aluminium. Three types of split metal ring are especially suitable:
 a. split metal ring,
 b. split metal ring with shield,
 c. split metal ring with shield suitable for dynamic sealing on a rotary table.

A single sealing station may comprise either a metal ring which follows the contours of the sealing surface (or is slightly inside it), or a metal plate with a hole cut centrally in the plate. The edges of the hole conform to the contours of the sealing edge or are slightly inside it. As the plate is used to screen the membrane from the direct R.F. energy from the work coil it is suitably made somewhat larger than the membrane. Localising of the heating effect of the coil on the sealing surface may be improved by modifying the plate to include a lip which follows the contour of the sealing edge (or is slightly inside it).

When using a split metal ring or plate as the field intensifier in this invention, the work coil is placed above the field intensifier which, in turn, is located over the membrane on the container. An additional closure (e.g. a snap-on or screw-on plastics cap), which may or may not be required, may or may not be applied to the container prior to the sealing operation. The container sealing edge, the membrane, and the intensifier, which may suitably have been potted in a suitable resin, are preferably held in compression while sealing takes place. The potted intensifier can, if necessary, also be fitted with a resilient pad. The bottom surface of the intensifier should be accurately machined so that the mouth of the container is correctly located with respect to the intensifier. The sealing pressure may be produced by means of a cam or piston.

Static and indexing operations require that the work coil, field intensifier and the membrane on the container remain stationary during the sealing operation. Dynamic operations require that the field intensifier and the membrane on the container must remain stationary with respect to each other during the sealing operation if the concentration of the induced energy is to be preserved in the manner that is required to effect a proper seal. Under dynamic operations, in which the container and membrane are on the move during the sealing operation, the field intensifier and the membrane on the container will normally pass under a stationary work coil since it is impracticable to move the work coil along with the intensifier.

Dynamic sealing, using a rotary table, may be achieved by means of a number of separate stations, each fitted with its own field intensifier, equally spaced around the table. In another embodiment of this form of the invention all the stations can be embodied in a single metal disc. Aluminium is a particularly suitable material for this disc. Holes, equally spaced around the table, are cut in the disc. Slits radiate from the holes to the periphery of the table. Since each hole corresponds to a station, the number of holes are determined by the number of stations. The stations on the plate are machined and constructed in a similar manner to the "single station," the difference being that the intensifier for each station forms part and parcel of the adjoining intensifiers.

Figure 10:
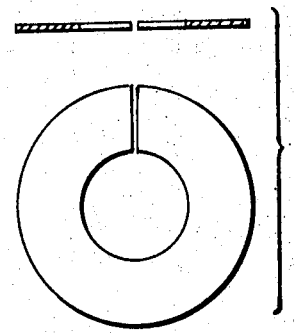
Figure 9:
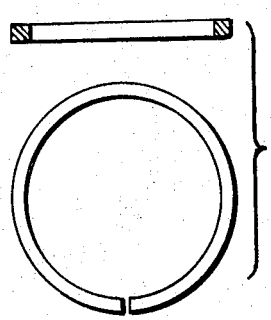
Figure 11:
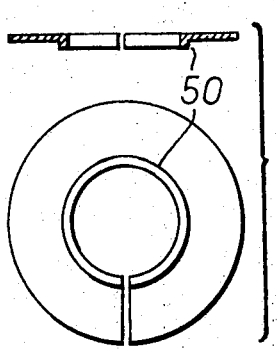
Figure 12:
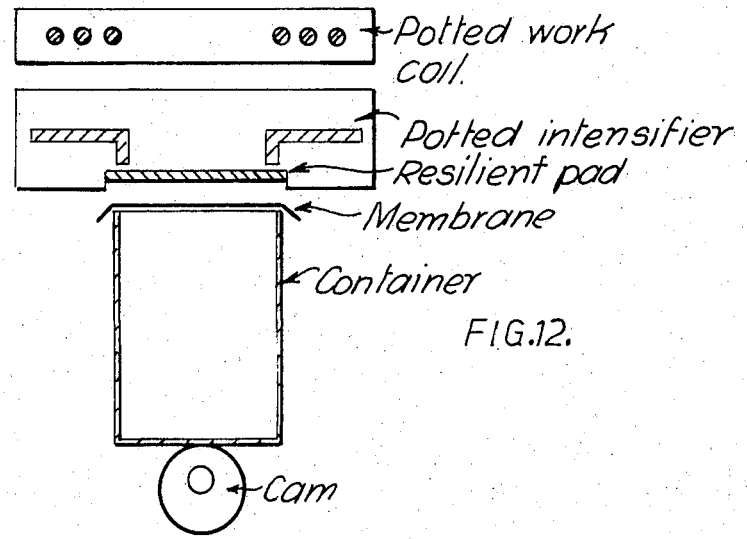
Figure 13:
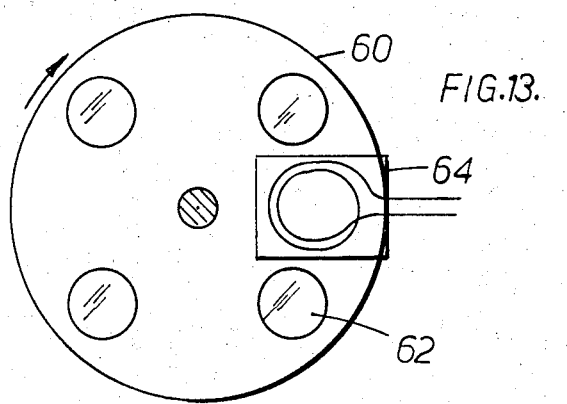
Figure 14:
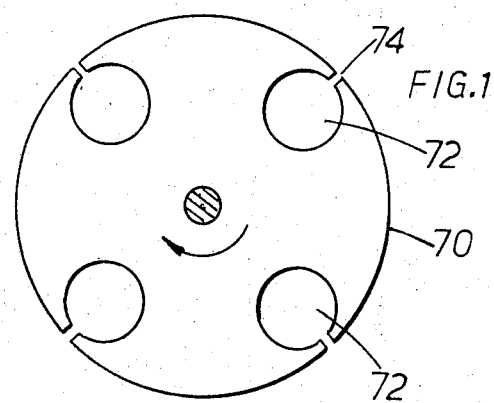
Figure 15:
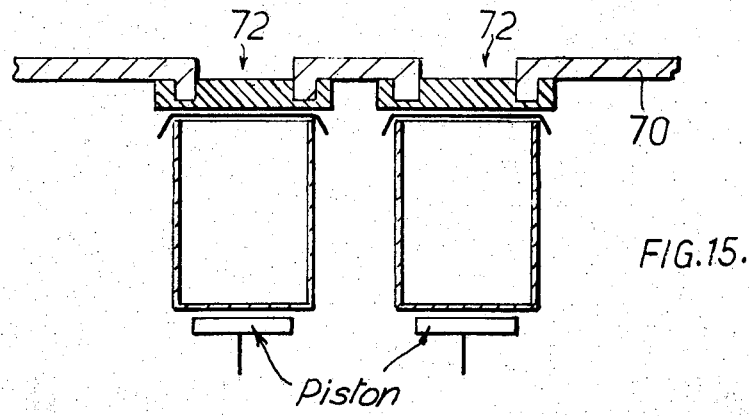
Figure 16:
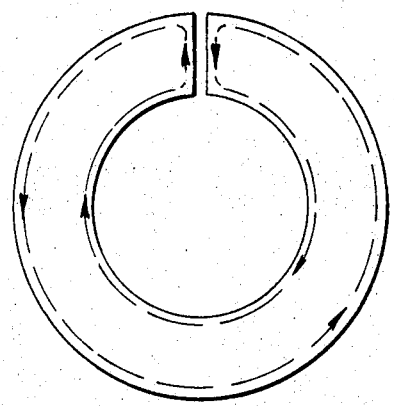
Figure 17:
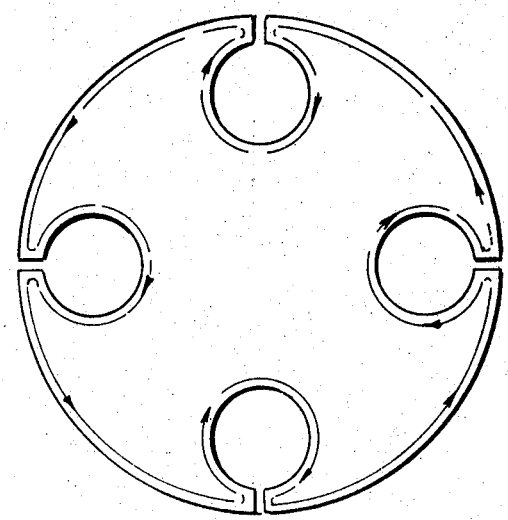

Reference will now be made to the accompanying drawings, which are of a diagrammatic nature, and in which FIG. 9 is a sectional and plan view of a split metal ring intensifier;

FIG. 10 is a sectional and plan view of a split metal plate intensifier;

FIG. 11 is a sectional and plan view of a modified plate intensifier;

FIG. 12 shows a typical sealing station;

FIG. 13 shows, in plan, a rotary table sealing apparatus;

FIG. 14 shows, in plan, a disc-type intensifier;

FIG. 15 shows a detail, in section, of a sealing apparatus using the disc-type intensifier of FIG. 14; and FIGS. 16 and 17 show the paths of the eddy currents in, respectively, the intensifiers of FIGS. 10 and 14.

Most of the drawings are self-explanatory. FIG. 9 shows a ring (e.g. of copper or aluminium) type intensifier, and in use is mounted, with respect to the container sealing surface, so as to follow the contours thereof, or to be slightly inside the sealing surface. With the annular plate-type intensifiers of FIGS. 10 and 11, the edges of the central hole conform to the contours of the sealing edge of the container or are slightly inside it. As the plate is used to screen the sealing membrane from direct R.F. energy from the work coil it is made larger than the membrane.

The modification shown in FIG. 11 has a downwardly directed lip 50 which follows the contours (or is slightly inside) the sealing edge.

FIG. 12 shows a typical sealing station, wherein the container sealing edge, the membrane and the intensifier (potted in a suitable resin), and also a resilient pad if necessary, are held in compression while sealing takes place. The bottom face of the intensifier will be accurately machined, so that the container is correctly located, and sealing pressure may be produced by a cam or a piston.

A rotary table, for dynamic sealing, is shown in FIG. 13, which depicts a table 60, which rotates to bring a number of sealing stations 62 (such as shown in FIG. 12) successively beneath a work coil 64.

A cheaper form of apparatus, dispensing with the need for a number of separate ring or annular plate intensifiers, is illustrated in FIGS. 14 and 15. A disc 70 is cut out as shown at 72 to provide a number of holes corresponding to the number of stations on a sealing apparatus. Slots 74 extend between the cut-outs 72 and the periphery of the disc. These slots allow the induced eddy currents to flow down the slot and around the periphery of each cut-out, as seen in FIG. 17.

What we claim is:

1. A method of induction heat sealing a metallic membrane to a container, wherein the sealing is brought about through the intermediary of a thermoplastic material coated on the membrane, comprising pressing a coated side of the membrane onto the mouth of the container and rapidly raising, by means of a magnetic field produced by an induced radio frequency current, the temperature of the membrane to cause the thermoplastic material to soften or melt and thus bring about adhesion or bonding between the membrane and the mouth of the container, wherein the magnetic flux density of the magnetic field is increased in regions of the membrane that correspond to the sealing edge of the mouth of the container by means of at least one positioned flux density intensifier.

2. A method as claimed in claim 1 wherein the flux density intensifier is a ferrite.

3. A method as claimed in claim 2 wherein at least one slab of ferrite are welded to an induction coil used in the sealing operation.

4. A method as claimed in claim 1 wherein the container and membrane are placed beneath an induction coil, the intensifier being disposed between the membrane and the coil.

5. A method as claimed in claim 1 wherein the container and membrane, with the intensifier disposed thereabove, are moved beneath a stationary induction coil.

6. A method as claimed in claim 5 wherein a plurality of intensifiers are mounted on a rotary table or disc adapted to bring the intensifiers successively bneath the induction coil.

7. A method as claimed in claim 1 wherein the flux density intensifier comprises a split metal plate.

8. A method as claimed in claim 7 wherein the metal is copper.

9. A method as claimed in claim 7 wherein the intensifier is a split metal annular plate having a lip extending normally from he inner periphery thereof.

10. A method as claimed in claim 7 wherein the metal ring or plate is encapsulated in a synthetic resinous material.

11. A method as claimed in claim 1 wherein the flux density intensifier comprises a metal disc having a plurality of cut-outs around its periphery, a slot being provided between each cut-out and said periphery.

12. A method as claimed in claim 1 wherein the container with the membrane thereon is moved during the sealing step in relation to an induction coil which supplies the said induced radio frequency current.

13. A method of claim 12 wherein the container mouth is non-circular or the membrane overhangs the mouth of the container.

14. A method as claimed in claim 13 wherein the flux density intensifiers are synchronized with the movement of the membrane on the container so that the flux density is stationary with respect to the membrane and the membrane is heated similar to that heating if the membrane were not moving.

* * * * *